(12) United States Patent
Johnson et al.

(10) Patent No.: US 11,364,759 B1
(45) Date of Patent: Jun. 21, 2022

(54) ADJUSTABLE VEHICLE SUSPENSION LINK SYSTEM AND METHODS

(71) Applicants: Jesse L. Johnson, Shreveport, LA (US); Garrett Russell Gibson, Bossier City, LA (US)

(72) Inventors: Jesse L. Johnson, Shreveport, LA (US); Garrett Russell Gibson, Bossier City, LA (US)

(73) Assignee: High Lifter Products Inc., Shreveport, LA (US)

( * ) Notice: Subject to any disclaimer, the term of this patent is extended or adjusted under 35 U.S.C. 154(b) by 0 days.

(21) Appl. No.: 16/858,918

(22) Filed: Apr. 27, 2020

(51) Int. Cl.
*B60G 7/00* (2006.01)

(52) U.S. Cl.
CPC ...... *B60G 7/003* (2013.01); *B60G 2206/1112* (2013.01); *B60G 2206/8207* (2013.01)

(58) Field of Classification Search
CPC B60G 7/001; B60G 7/003; B60G 2206/1112; B60G 2206/8207; B62D 7/16; B62D 7/20
See application file for complete search history.

(56) References Cited

U.S. PATENT DOCUMENTS

| 5,354,092 A | 10/1994 | Calvert | |
|---|---|---|---|
| 6,074,125 A * | 6/2000 | Krawczak | B62D 7/20 280/93.51 |
| 7,185,556 B2 * | 3/2007 | Beattie | B60G 7/003 29/516 |
| 7,201,530 B2 | 4/2007 | Wappes, II et al. | |
| 7,850,178 B2 | 12/2010 | Fischer et al. | |
| 8,376,380 B2 | 2/2013 | Smith | |
| 8,419,031 B1 | 4/2013 | Verbowski | |
| 8,985,264 B2 | 3/2015 | Shirley | |
| 10,099,530 B2 * | 10/2018 | Grimes | B60G 9/00 |
| 2005/0044985 A1 | 3/2005 | Beattie | |
| 2015/0107404 A1 | 4/2015 | Heidingsfelder et al. | |
| 2017/0174033 A1 * | 6/2017 | Everline | B60G 7/02 |
| 2019/0126982 A1 * | 5/2019 | Boyd | B62D 7/20 |

FOREIGN PATENT DOCUMENTS

DE 102014101711 A1 * 8/2014 .......... F16C 11/0604

* cited by examiner

*Primary Examiner* — Jonathan Ng
*Assistant Examiner* — Mary E Young
(74) *Attorney, Agent, or Firm* — R. Keith Harrison (57) ABSTRACT

Adjustable vehicle suspension link systems suitable for connecting a first component to a second component in a vehicle suspension may include an outer assembly. An outer assembly connecting joint may be provided on the outer assembly. The outer assembly connecting joint may be configured for coupling to the first component of the vehicle suspension. An inner assembly may be disposed at least partially inside and in length-adjustable and securable relationship to the outer assembly. An inner assembly connecting joint may be provided on the inner assembly. The inner assembly connecting joint may be configured for coupling to the second component of the vehicle suspension. Adjustable vehicle suspension link methods are also disclosed.

19 Claims, 11 Drawing Sheets

ADJUSTABLE VEHICLE SUSPENSION LINK SYSTEM AND METHODS

FIELD

Illustrative embodiments of the disclosure relate to suspension links, control links and other suspension members which connect structural members in vehicle suspensions. More particularly, illustrative embodiments of the disclosure relate to adjustable vehicle suspension link systems and methods suitable for connecting structural members in a vehicle suspension.

SUMMARY

Illustrative embodiments of the disclosure are generally directed to adjustable vehicle suspension link systems suitable for connecting a first component to a second component in a vehicle suspension. An illustrative embodiment of the adjustable vehicle suspension link systems may include an outer assembly. An outer assembly connecting joint may be provided on the outer assembly. The outer assembly connecting joint may be configured for coupling to the first component of the vehicle suspension. An inner assembly may be disposed at least partially inside and in length-adjustable and securable relationship to the outer assembly. An inner assembly connecting joint may be provided on the inner assembly. The inner assembly connecting joint may be configured for coupling to the second component of the vehicle suspension.

Illustrative embodiments of the disclosure are further generally directed to methods of connecting a first component to a second component in a vehicle suspension. An illustrative embodiment of the methods may include obtaining an outer assembly having an outer assembly arm, an outer assembly sleeve extending from the outer assembly arm, an outer assembly connecting joint on the outer assembly arm and a plurality of outer assembly adjusting threads in the outer assembly arm; obtaining an inner assembly having an inner assembly arm, a length adjusting member extending from the inner assembly arm, an inner assembly connecting joint on the inner assembly arm and a plurality of inner assembly adjusting threads on the length adjusting member, forming an adjustable vehicle suspension link system by inserting the length adjusting member of the inner assembly into the outer assembly sleeve of the outer assembly; attaining a selected length of the adjustable vehicle suspension link system by engaging the plurality of inner assembly adjusting threads on the length adjusting member of the inner assembly with the plurality of outer assembly adjusting threads in the outer assembly arm of the outer assembly; securing the selected length of the adjustable vehicle suspension link system; and installing the adjustable vehicle suspension link system between the first component and the second component of the vehicle suspension.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower" "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
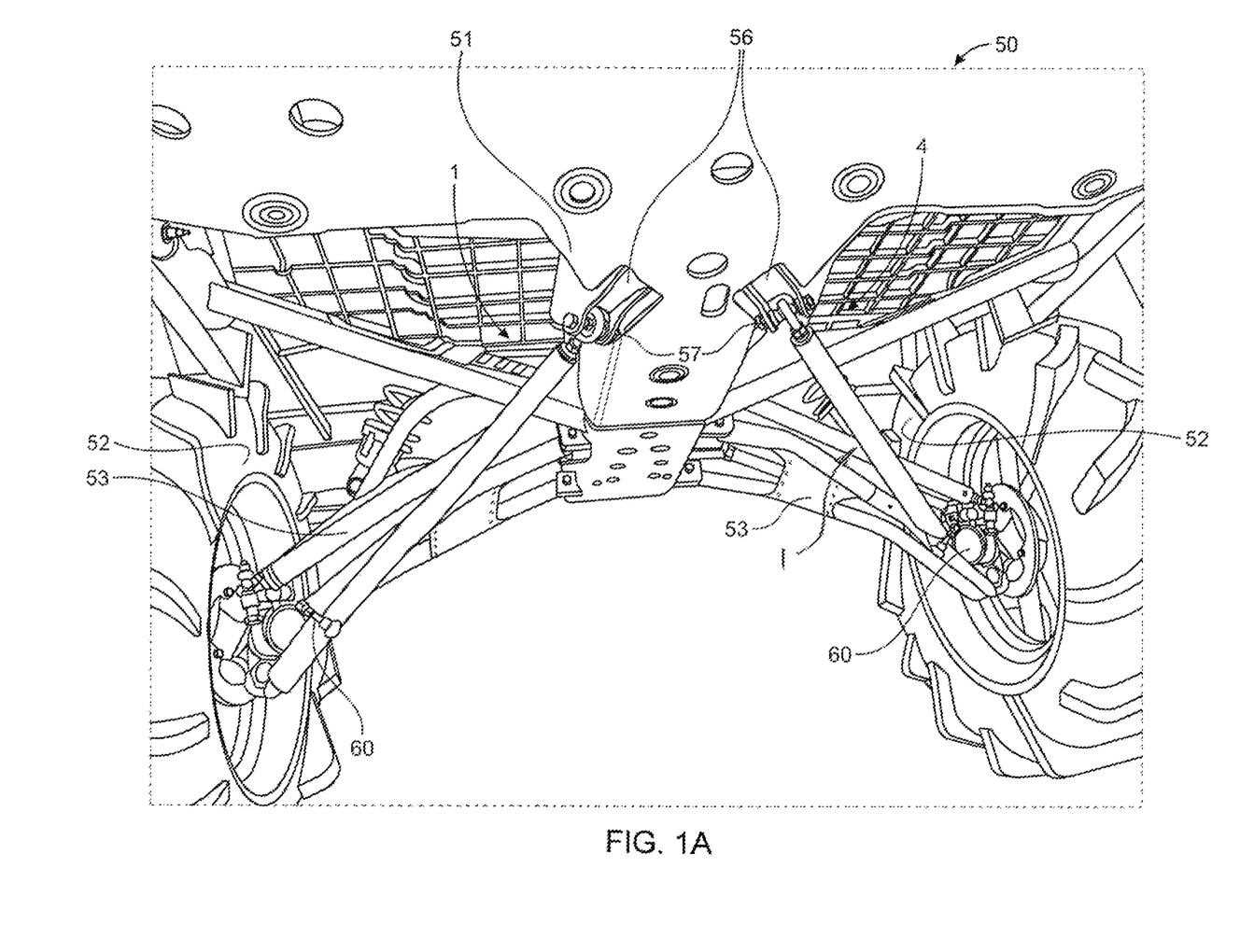
FIG. 1A is a bottom rear perspective view of a typical vehicle suspension on a vehicle such as an ATV (All-Terrain Vehicle), with a pair of the adjustable vehicle suspension link systems according to an illustrative embodiment of the disclosure installed as a control arm link between the vehicle frame and a respective pair of control arms in the vehicle suspension in typical application of the adjustable vehicle suspension link systems.

Referring initially to FIG. 1A of the drawings, an illustrative embodiment of the adjustable vehicle suspension link systems, hereinafter system, is generally indicated by reference numeral 1. In a typical control link application, which will be hereinafter described, the system 1 may be installed in a vehicle suspension 53 on a vehicle 50 such as an ATV, side-by-side or automobile, for example and without limitation. The system 1 may be suitable for connecting a first component to a second component in the vehicle suspension 53. The vehicle 50 may include a vehicle frame 51. Vehicle wheels 52 may be mounted on axles (not numbered) on the vehicle frame 51. At least one control arm 54 may extend from the vehicle frame 51 to each vehicle wheel 52. In some applications, at least one system 1 may be installed typically between the vehicle frame 51 and a control arm 54 at each vehicle wheel 52 to stabilize the control arm 54 with respect to the corresponding vehicle wheel 52. Each system 1 may be selectively adjustable in length to facilitate installation in vehicles 50 having a variety of sizes, models and types.

Figure 1B:
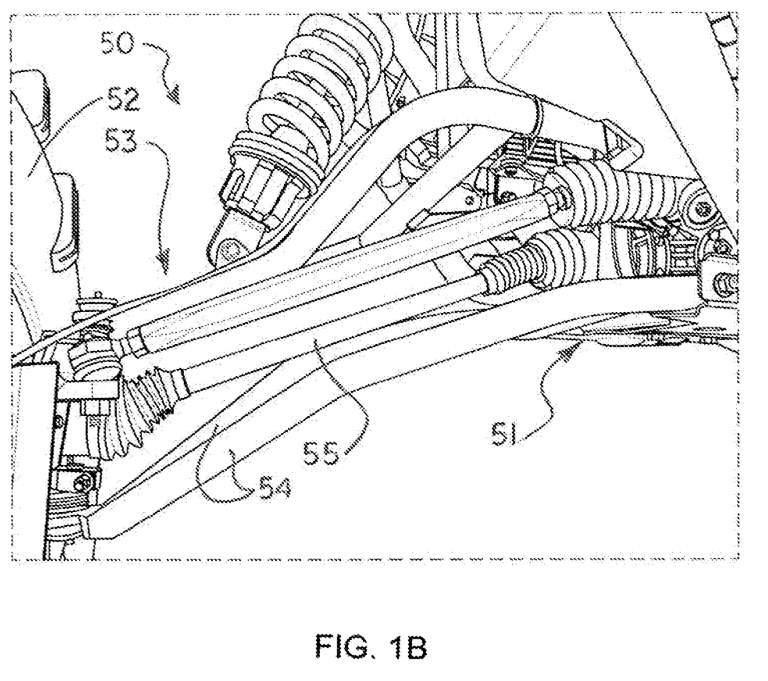
FIG. 1B is a perspective view of a typical vehicle suspension on a vehicle, with an adjustable vehicle suspension link system according to an illustrative embodiment of the disclosure installed as a tie rod between the vehicle frame and the vehicle wheel in the vehicle suspension in typical application of the adjustable vehicle suspension link systems.

As illustrated in FIG. 1B, in a typical tie rod application, the system 1 may be installed between the vehicle frame 51 and the vehicle wheel 52 in the vehicle suspension 53. Accordingly, the system 1 may replace the fixed-length, factory tie rod and function as an adjustable tie rod. This expedient may enable an end user to adjust the steering of the vehicle 50 to different suspension configurations. Accordingly, the length of the system 1 can be adjusted to function with different control arms, large lift kits and any applications which would require different tie rod lengths. The tie rod applications of the system 1 may be connectable to rack and pinions, steering stems, front knuckle/hub assemblies, Pitman/idler arms and dampeners, for example and without limitation, and other steering support systems.

Based on the following description, it will be appreciated by those skilled in the art that the system 1 may be used in a variety of alternative automobile link applications.

Figure 2:
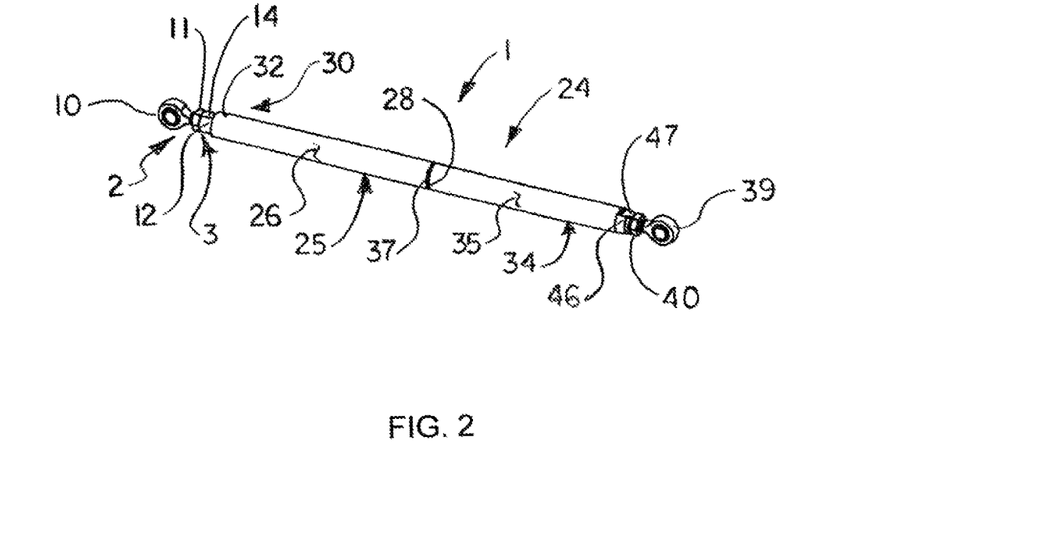
FIG. 2 is a perspective view of an illustrative embodiment of the assembled adjustable vehicle suspension link systems.
Figure 3:
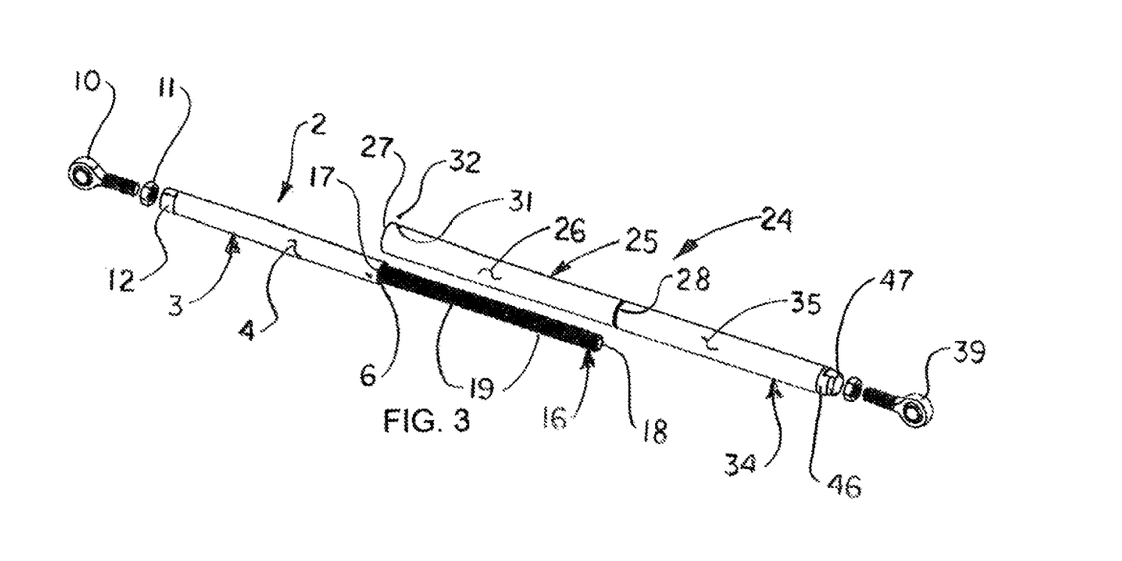
FIG. 3 is an exploded perspective view of an illustrative embodiment of the disassembled adjustable vehicle suspension link systems.
Figure 4:
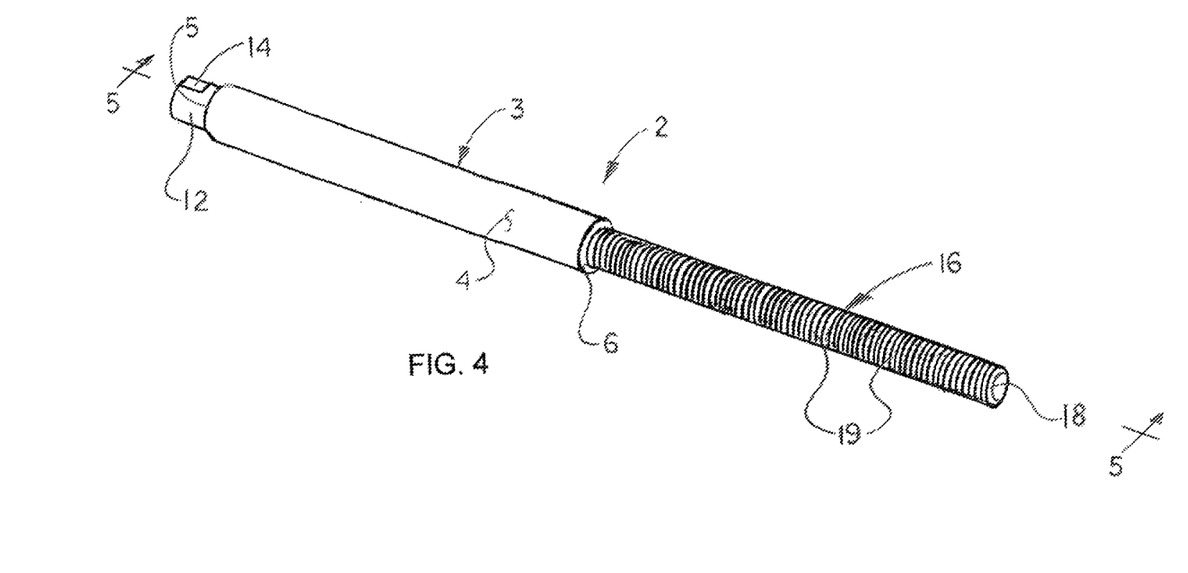
FIG. 4 is a perspective view of a typical inner assembly of the illustrative adjustable vehicle suspension link system.

Referring next to FIGS. 2 and 3 of the drawings, the system 1 may include an outer assembly 24. An outer assembly connecting joint 39 may be provided on the outer assembly 24. The outer assembly connecting joint 39 may be configured for coupling to the first component of the vehicle suspension 53 (FIG. 1). An inner assembly 2 may be disposed at least partially inside and in length-adjustable and securable relationship to the outer assembly 24. For example and without limitation, in some embodiments, the inner assembly 2 may be telescopically disposed in the outer assembly 24. An inner assembly connecting joint 10 may be provided on the inner assembly 2. The inner assembly connecting joint 10 may be configured for coupling to the second component of the vehicle suspension 53. In some embodiments of the system 1, at least one of the outer assembly connecting joint 39 and the inner assembly connecting joint 10 may include a heim joint known by those skilled in the art. Connecting ends which are suitable for the outer assembly connecting joint 39 and the inner assembly connecting joint 10 include but are not limited to heim joints, spherical rod ends, tie rod ends and articulating joints.

Figure 5:
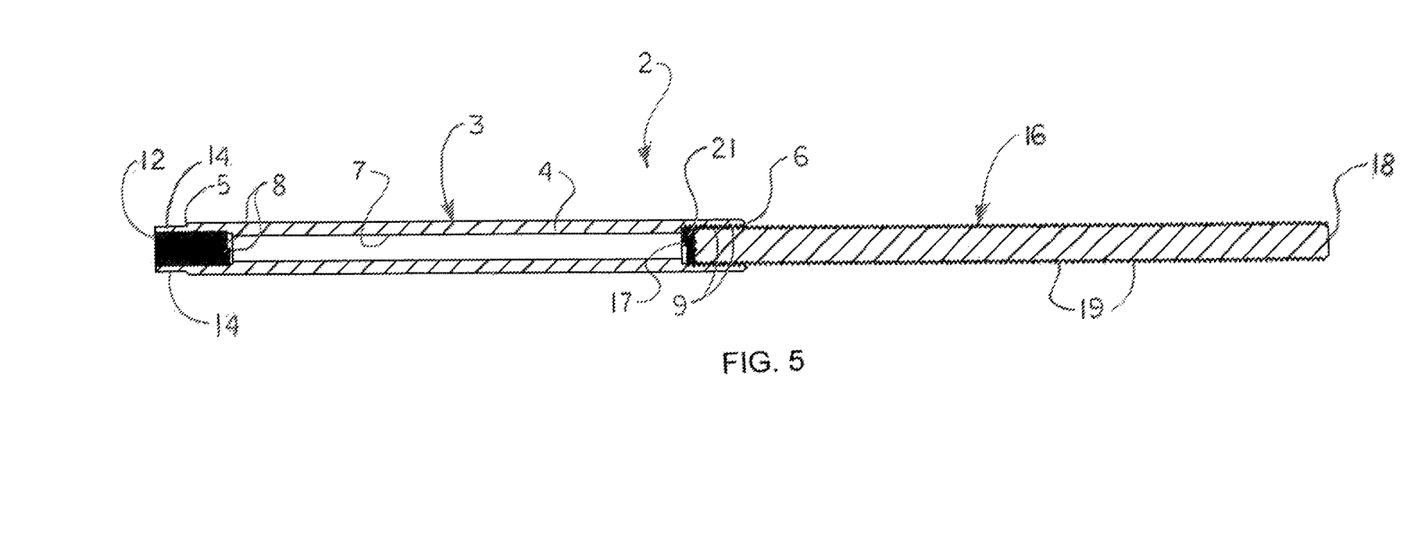
FIG. 5 is a longitudinal sectional view, taken along section lines 5-5 in FIG. 4, of the inner assembly of the illustrative adjustable vehicle suspension link system.
Figure 6:
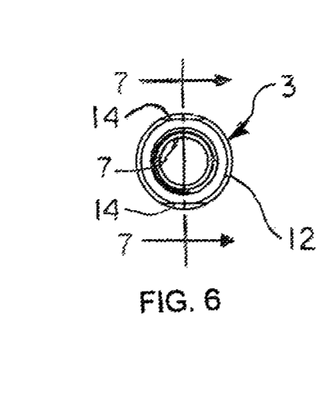
FIG. 6 is an end view of a typical inner assembly arm of the inner assembly.
Figure 7:
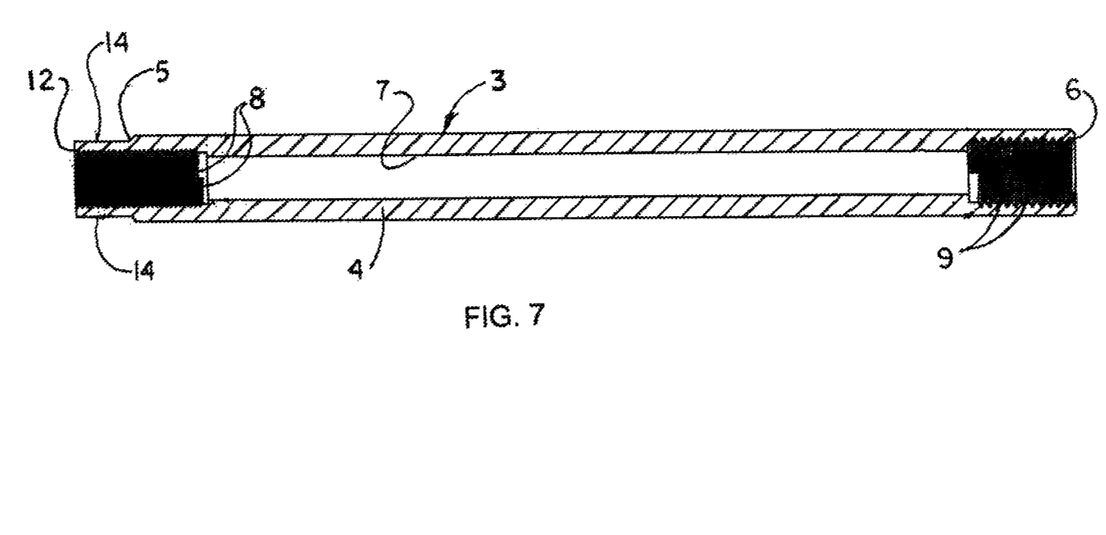
FIG. 7 is a longitudinal sectional view, taken along section lines 7-7 in FIG. 6, of the inner assembly arm.
Figure 8:
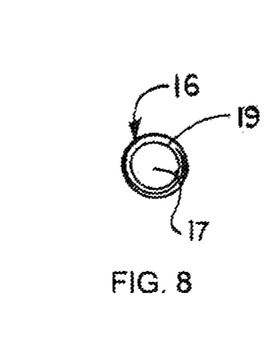
FIG. 8 is an end view of a typical length adjusting member of the inner assembly.

As illustrated in FIGS. 3-9, the inner assembly 2 of the system 1 may include an inner assembly arm 3. The inner assembly arm 3 may include an elongated inner assembly arm wall 4 having an inner assembly joint end 5 and a length adjusting member end 6. As illustrated in FIGS. 5-7, an inner assembly arm bore 7 may traverse the length of the inner assembly arm 3 from the inner assembly joint end 5 to the length adjusting member end 6.

The inner assembly connecting joint 10 may be attached to the inner assembly joint end 5 of the inner assembly arm 3 according to the knowledge of those skilled in the art. Accordingly, as illustrated in FIGS. 5 and 7, in some embodiments, an inner assembly joint neck 12 may extend from the inner assembly joint end 5 of the inner assembly arm 3. Interior joint connecting threads 8 may be provided in the interior surface of the inner assembly joint neck 12. The joint connecting threads 8 may extend into at least a portion of the interior surface of the inner assembly arm wall 4. Accordingly, the inner assembly connecting joint 10 (FIGS. 2 and 3) may be connected to the inner assembly joint end 5 of the inner assembly arm 3 by threaded engagement with the joint connecting threads 8. A securing nut 11 may facilitate attachment of the inner assembly connecting joint 10 to the inner assembly arm 3. In some embodiments, at least one wrench flat 14 may be provided in the inner assembly joint neck 12. The wrench flat 14 may facilitate the threaded engagement of the inner assembly connecting joint 10 to the inner assembly arm 3.

Figure 9:
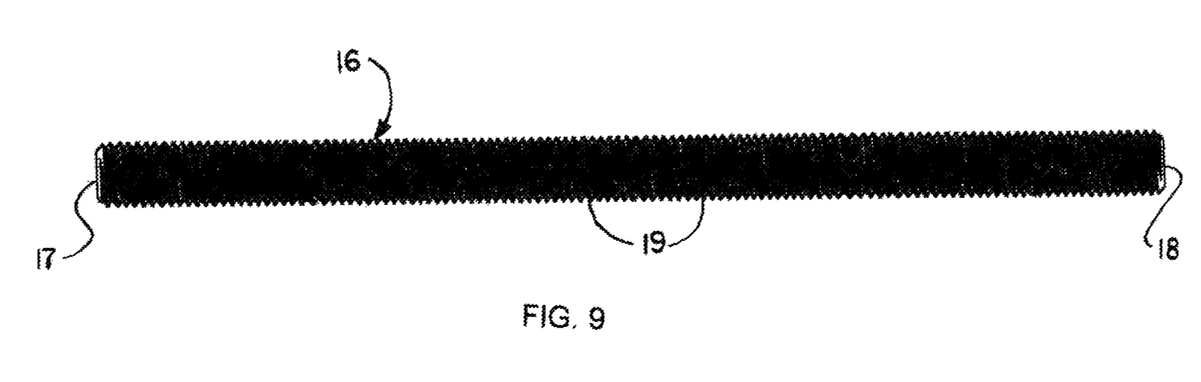
FIG. 9 is a typical side view of the length adjusting member.

As further illustrated in FIGS. 3-5, 8 and 9, an elongated length adjusting member 16 may extend from the length adjusting member end 6 of the inner assembly arm 3. As particularly illustrated in FIG. 5, the length adjusting member 16 may have a proximal adjusting member end 17 at the length adjusting member end 6 of the inner assembly arm 3 and a distal adjusting member end 18 opposite the proximal adjusting member end 17. Exterior inner assembly adjusting threads 19 may be provided on the length adjusting member 16. The inner assembly adjusting threads 19 may extend along at least a portion of the length adjusting member 16. As illustrated in FIG. 9, in some embodiments, the inner assembly adjusting threads 19 may traverse substantially the entire length of the length adjusting member 16 from the proximal adjusting member end 17 to the distal adjusting member end 18. As illustrated in FIG. 5, in some embodiments, the proximal adjusting member end 17 portion of the length adjusting member 16 may be attached to the inner assembly arm wall 4 of the inner assembly arm 3 via at least one weld 21.

Figure 10:
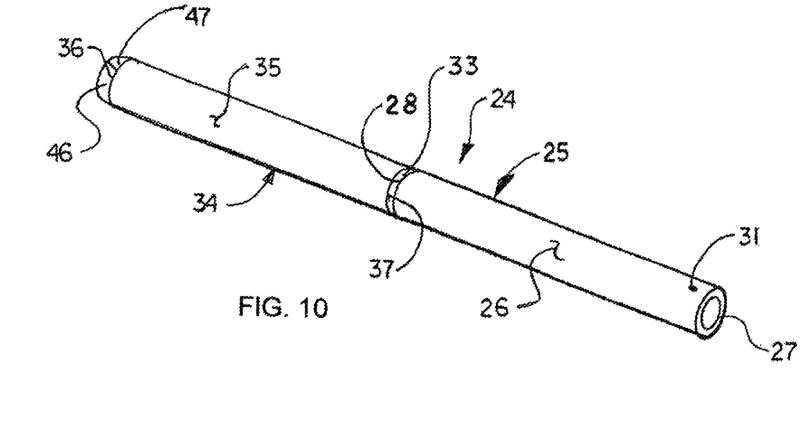
FIG. 10 is a perspective view of a typical outer assembly of the illustrative adjustable vehicle suspension link system.
Figures 11, 12:
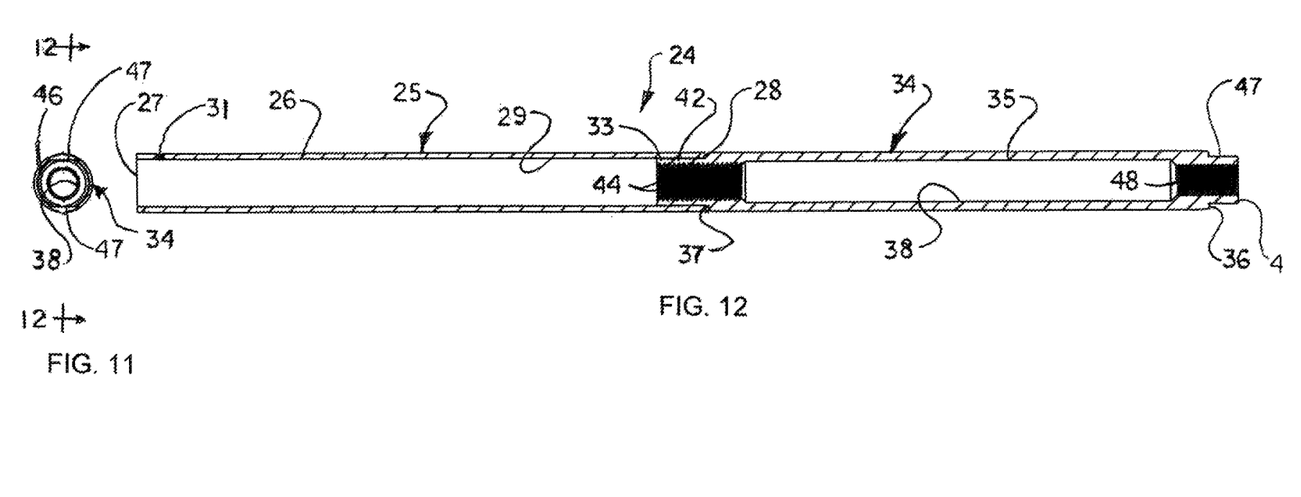
FIG. 11 is a typical end view of the outer assembly.
FIG. 12 is a longitudinal sectional view, taken along section lines 12-12 in FIG. 11, of the outer assembly.
Figure 13:
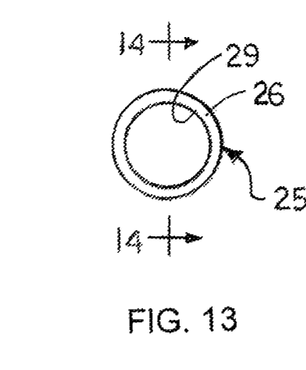
FIG. 13 is an end view of a typical outer assembly sleeve of the outer assembly.
Figure 14:
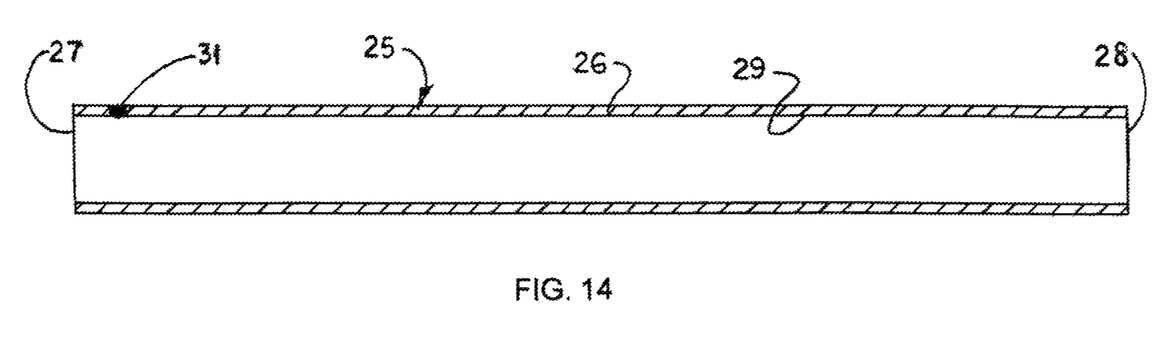
FIG. 14 is a longitudinal sectional view, taken along section lines 14-14 in FIG. 13, of the outer assembly sleeve.
Figure 15:
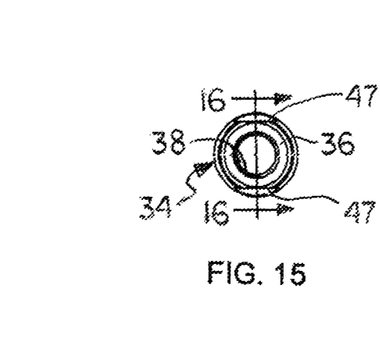
FIG. 15 is an end view of a typical outer assembly arm of the outer assembly.

Referring next to FIGS. 10-16 of the drawings, the outer assembly 24 of the system 1 may include an outer assembly sleeve 25. As illustrated in FIGS. 12-14, the outer assembly sleeve 25 may have an elongated sleeve wall 26 with an adjusting end 27 and an arm connecting end 28 opposite the adjusting end 27. A sleeve bore 29 may traverse the length of the outer assembly sleeve 25 from the adjusting end 27 to the arm connecting end 28. In some embodiments, at least one set screw opening 31 may extend through the sleeve wall 26 typically at or adjacent to the adjusting end 27 for purposes which will be hereinafter described.

An outer assembly arm 34 may extend from the arm connecting end 28 of the outer assembly sleeve 25. The outer assembly arm 34 may have an elongated outer assembly arm wall 35 with an outer assembly joint end 36 and a sleeve connecting end 37. An outer assembly arm bore 38 may traverse the length of the outer assembly arm 34 from the outer assembly joint end 36 to the sleeve connecting end 37.

Figure 16:
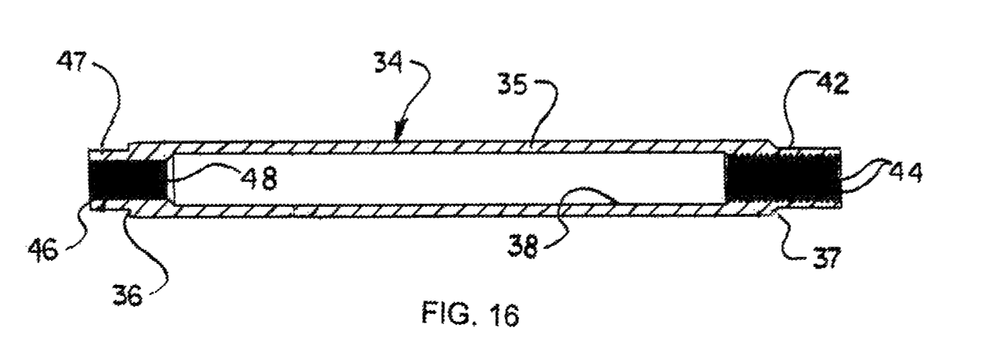
FIG. 16 is a longitudinal sectional view, taken along section lines 16-16 in FIG. 15, of the outer assembly arm.

The outer assembly connecting joint 39 (FIGS. 2 and 3) may be attached to the outer assembly joint end 36 of the outer assembly arm 34 according to the knowledge of those skilled in the art. Accordingly, as illustrated in FIGS. 10, 12 and 16, in some embodiments, an outer assembly joint neck 46 may extend from the outer assembly joint end 36 of the outer assembly arm 34. Interior joint connecting threads 48 may be provided in the interior surface of the outer assembly joint neck 46. The joint connecting threads 48 may extend into at least a portion of the interior surface of the outer assembly arm wall 35. Accordingly, the outer assembly connecting joint 39 (FIGS. 2 and 3) may be connected to the outer assembly joint end 36 of the outer assembly arm 34 by threaded engagement with the joint connecting threads 48. A securing nut 40 (FIGS. 2 and 3) may facilitate attachment of the outer assembly connecting joint 39 to the outer assembly arm 34. In some embodiments, at least one wrench flat 47 may be provided in the outer assembly joint neck 46. The wrench flat 47 may facilitate the threaded engagement of the outer assembly connecting joint 39 to the outer assembly arm 34.

The outer assembly arm 34 may be attached to the outer assembly sleeve 25 of the outer assembly 24 according to the knowledge of those skilled in the art. Accordingly, as further illustrated in FIGS. 12 and 16, in some embodiments, a sleeve connecting neck 42 may extend from the sleeve connecting end 37 of the outer assembly arm 34. The sleeve connecting neck 42 may be suitably sized and configured for insertion into the open arm connecting end 28 of the outer assembly sleeve 25. At least one weld 33 may be provided between the sleeve wall 26 of the outer assembly sleeve 25 and the sleeve connecting neck 42 of the outer assembly arm 34.

As further illustrated in FIGS. 12 and 16, a plurality of interior outer assembly adjusting threads 44 may be provided in the outer assembly 24. In some embodiments, the outer assembly adjusting threads 44 may be provided on the interior surface of the outer assembly arm wall 35 of the outer assembly arm 34. The outer assembly adjusting threads 44 may extend along at least a portion of the length of the outer assembly arm 34. The outer assembly adjusting threads 44 may extend into at least a portion of the sleeve connecting neck 42. As will be hereinafter further described, the inner assembly adjusting threads 19 on the length adjusting member 16 of the inner assembly 2 may threadably engage the outer assembly adjusting threads 44 in the outer assembly 24 to facilitate a selected length of the system 1 in installation of the system 1 in the vehicle suspension 53 of the vehicle 50 (FIG. 1), as will be hereinafter described.

Figure 21:
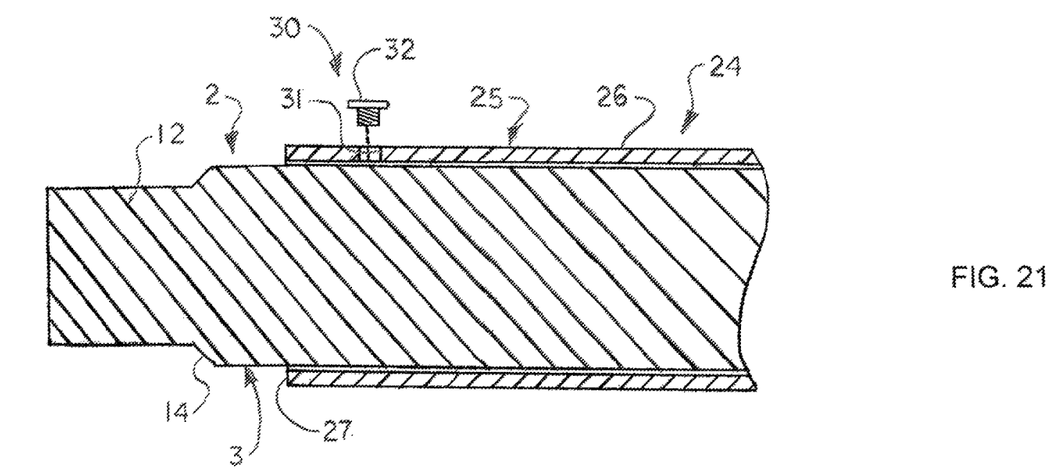
FIG. 21 is an enlarged sectional view of the inner assembly arm of the inner assembly extending beyond the adjusting end of the outer assembly sleeve of the outer assembly, more particularly illustrating a typical set screw technique for securing the inner assembly at a selected length with respect to the outer assembly and the set screw removed from the set screw opening.
Figure 22:
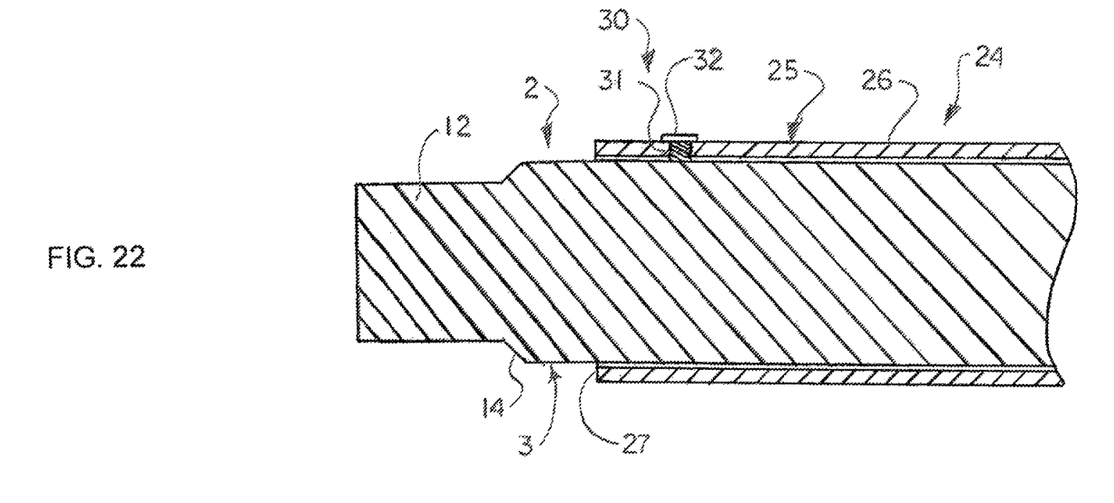
FIG. 22 is an enlarged sectional view of the inner assembly arm of the inner assembly extending beyond the adjusting end of the outer assembly sleeve of the outer assembly, with the set screw in place in the set screw opening.

As illustrated in FIGS. 21 and 22, at least one retaining mechanism 30 may retain the inner assembly 2 at a selected length from the outer assembly 24. The retaining mechanism 30 may have any design which is suitable for the purpose. In some embodiments, the retaining mechanism 30 may include at least one set screw opening 31 which may extend through the sleeve wall 26 of the outer assembly sleeve 25. At least one set screw 32 may be threaded in the set screw opening 31. The set screw 32 may be threaded and tightened against the inner assembly arm 3 of the inner assembly 2 to secure the inner assembly arm 3 at a selected extension with respect to the outer assembly sleeve 25 and achieve a selected length of the system 1.

Referring again to FIGS. 1A and 1B and to FIGS. 17-22 of the drawings, in typical application, the system 1 may be installed in the vehicle suspension 53 of the vehicle 50 to connect a first component to a second component in the vehicle suspension 53. For example and without limitation, as illustrated in FIG. 1A, in some applications, a system 1 may be installed as a control arm link between the vehicle frame 51 and a corresponding control arm 54 in the vehicle suspension 53 to impart stability to the control arms 54. As illustrated in FIG. 1B, in some applications, the system 1 may be installed as a tie rod between the vehicle frame 51 and the vehicle wheel 52 in the vehicle suspension 53. The system 1 may be used in a variety of alternative automobile link applications.

The length of the assembled system 1 may be selected and secured to achieve the desired distance or spacing between the inner assembly connecting joint 10 on the inner assembly 2 and the outer assembly connecting joint 39 on the outer assembly 24 to accord with the corresponding distance or spacing between the components which are to be connected in the vehicle suspension 53. As further illustrated in FIG. 1, in typical application, a first one of the inner assembly connecting joint 10 and the outer assembly connecting joint 39 on the system 1 may be coupled to the vehicle frame 51 via a mount plate 56 and at least one mount fastener 57. The opposite one of the inner assembly connecting joint 10 and the outer assembly connecting joint 39 may be coupled to a corresponding control arm 54 via a mount clamp 60.

Figure 17:
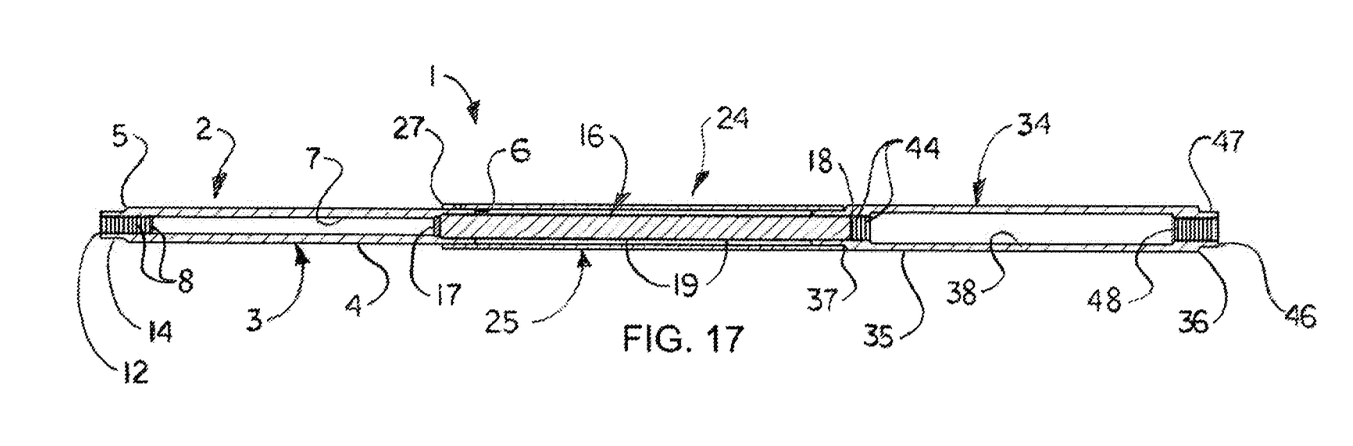
FIG. 17 is a longitudinal sectional view of the illustrative adjustable vehicle suspension link system deployed in an elongated configuration.
Figure 18:
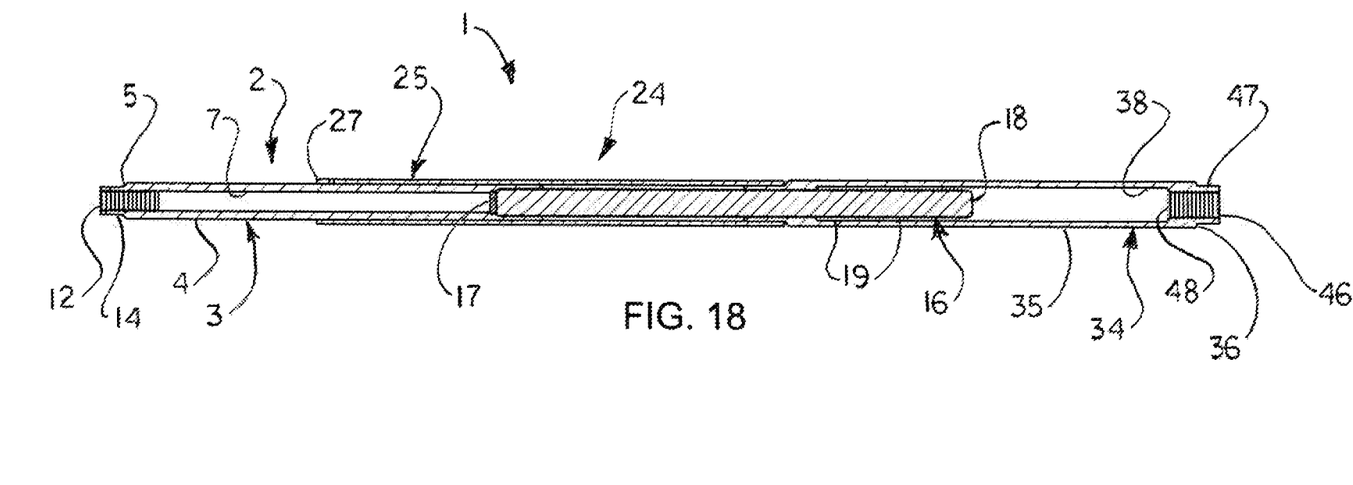
FIG. 18 is a longitudinal sectional view of the illustrative adjustable vehicle suspension link system deployed in a shortened configuration.
Figure 19:
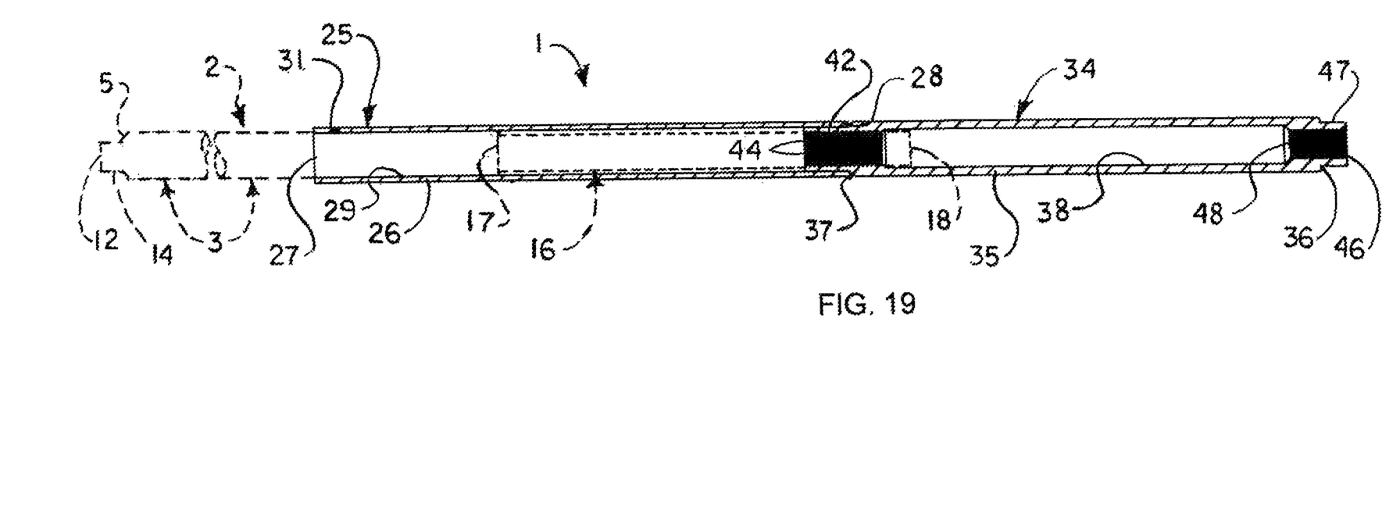
FIG. 19 is a longitudinal sectional view of the outer assembly of the illustrative adjustable vehicle suspension link system, deployed in the elongated configuration, with the inner assembly illustrated in phantom and engaging the interior adjusting threads in the outer assembly.
Figure 20:
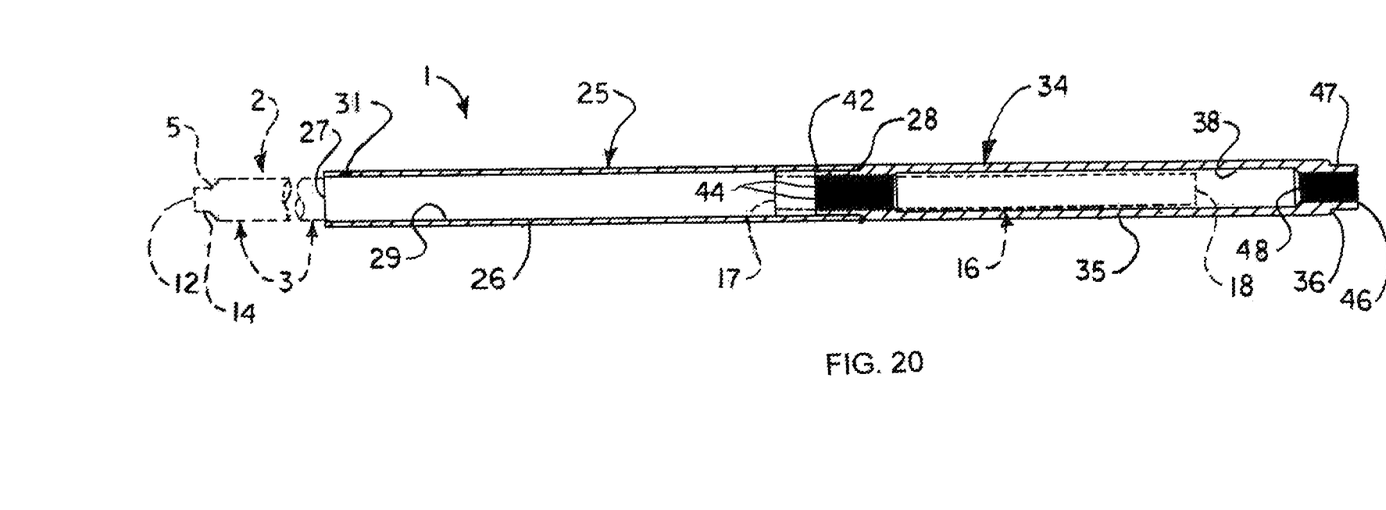
FIG. 20 is a longitudinal sectional view of the outer assembly of the illustrative adjustable vehicle suspension link system, deployed in the shortened configuration, with the inner assembly illustrated in phantom and engaging the interior adjusting threads in the outer assembly.

The adjustable vehicle suspension link system 1 may be assembled by inserting the length adjusting member 16 and the inner assembly arm 3 of the inner assembly 2 into the outer assembly sleeve 25 of the outer assembly 24. The inner assembly 2 may be rotated to facilitate engagement of the inner assembly adjusting threads 19 on the length adjusting member 16 of the inner assembly 2 with the companion outer assembly adjusting threads 44 in the outer assembly arm bore 38 of the outer assembly arm 44. Rotation of the inner assembly 2 with respect to the outer assembly 24 may be facilitated by engagement of a wrench (not illustrated) or like tool with the wrench flats 14 on the inner assembly arm 3. As illustrated in FIGS. 17-20, it will be appreciated by those skilled in the art that the selected length of the system 1 is highly variable as the inner assembly adjusting threads 19 on any location along the length of the length adjusting member 16 can typically be engaged with the outer assembly adjusting threads 44 in the outer assembly arm 44 to achieve a selected extension length of the inner assembly arm 3 beyond the adjusting end 27 of the outer assembly sleeve 25. For example, as illustrated in FIGS. 17 and 19, in applications in which the length of the system 1 is required to be relatively long to extend the reach between the first and second components in the vehicle suspension 53 (FIG. 1), the inner assembly adjusting threads 19 which are closest to the distal adjusting member end 18 of the length adjusting member 16 may be engaged with the outer assembly adjusting threads 44 in the outer assembly 24. Conversely, as illustrated in FIGS. 18 and 20, in applications in which the length of the system 1 is required to be relatively short, the inner assembly adjusting threads 19 which are closest to the proximal adjusting member end 17 of the length adjusting member 16 may be engaged with the outer assembly adjusting threads 44 in the outer assembly 24. For intermediate lengths of the system 1, the inner assembly adjusting threads 19 which are in the middle portion on the length adjusting member 16 may be engaged with the outer assembly adjusting threads 44.

After the desired length of the system 1 is achieved, the retaining mechanism 30 may be engaged to secure the system 1 at the selected length. Accordingly, as illustrated in FIGS. 21 and 22, in some embodiments, the set screw 32 may be threaded into the set screw opening 31 and tightened against the inner assembly arm 3 to secure the inner assembly arm 3 at the selected extended length beyond the adjusting end 27 of the outer assembly sleeve 25 of the outer assembly 24. The retaining mechanism 30 may include additional or alternative retaining techniques which are suitable for the purpose of retaining or securing the inner assembly arm 3 of the inner assembly 2 with respect to the outer assembly sleeve 25 of the outer assembly 24.

Figure 23:
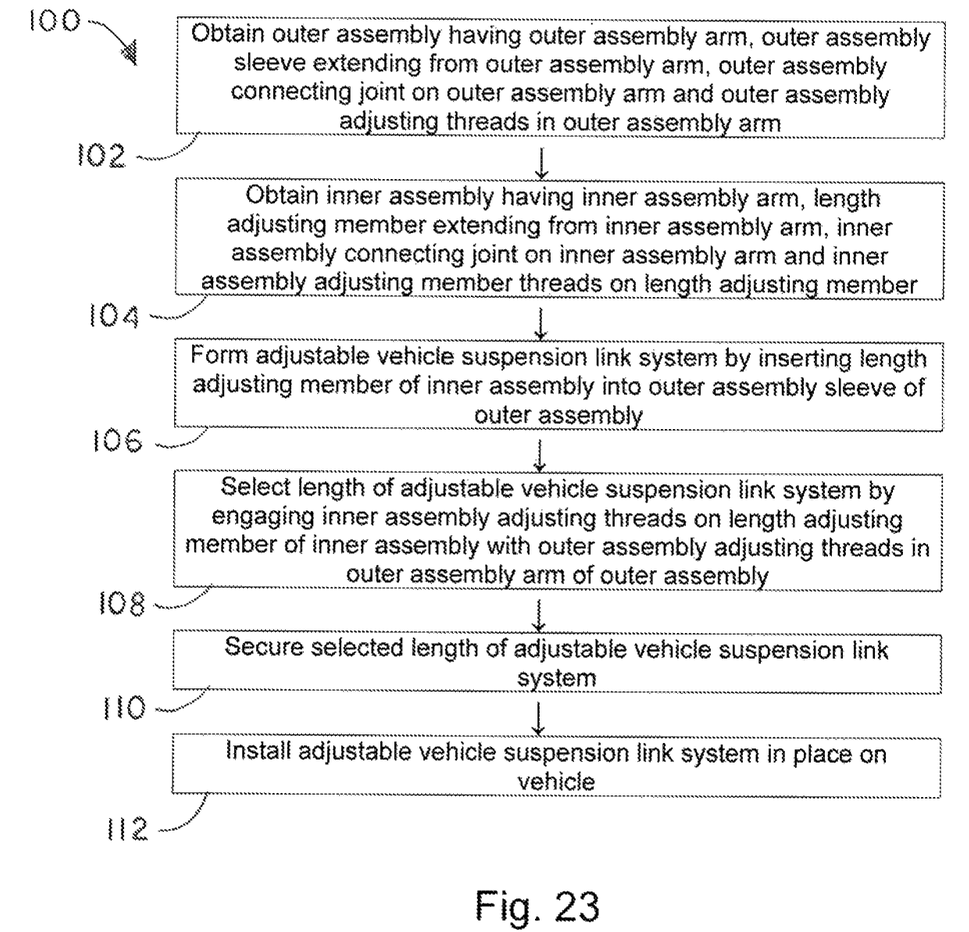
FIG. 23 is a flow diagram of an illustrative embodiment of the adjustable vehicle suspension link methods.

Referring next to FIG. 23 of the drawings, a flow diagram 100 of an illustrative embodiment of the adjustable vehicle suspension link methods is illustrated. At Step 102, an outer assembly may be obtained. The outer assembly may include an outer assembly arm. An outer assembly sleeve may extend from the outer assembly arm. An outer assembly connecting joint maybe provided on the outer assembly arm. Outer assembly adjusting threads may be provided in the outer assembly arm.

At Step 104, an inner assembly may be obtained. The inner assembly may include an inner assembly arm. A length adjusting member may extend from the inner assembly arm. An inner assembly connecting joint may be provided on the inner assembly arm. Inner assembly adjusting threads may be provided on the length adjusting member. The inner assembly adjusting threads may be configured to engage the companion outer assembly adjusting threads on the outer assembly as the length adjusting member and the inner assembly arm of the inner assembly are inserted into the outer assembly sleeve of the outer assembly.

At Step 106, an adjustable vehicle suspension link system may be formed by inserting the length adjusting member and the inner assembly arm of the inner assembly into the outer assembly sleeve of the outer assembly.

At Step 108, a length of the adjustable vehicle suspension link system may be selected by engaging the inner assembly adjusting threads on the length adjusting member of the inner assembly with the companion outer assembly adjusting threads in the outer assembly arm of the outer assembly.

At Step 110, the selected length of the adjustable link system may be secured.

At Step 112, the adjustable vehicle suspension link system may be installed in place in the vehicle suspension of the vehicle.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. An adjustable vehicle suspension link system suitable for connecting a first component to a second component in a vehicle suspension, comprising:
   an outer assembly;
   an outer assembly connecting joint carried by the outer assembly, the outer assembly connecting joint configured for coupling to the first component of the vehicle suspension;
   an inner assembly retractable entirely inside and extendable in length-adjustable and securable relationship to the outer assembly;
   an inner assembly connecting joint carried by the inner assembly, the inner assembly connecting joint configured for coupling to the second component of the vehicle suspension; and
   wherein the inner assembly is telescopically disposed in the outer assembly.

2. The adjustable vehicle suspension link system of claim 1 wherein at least one of the outer assembly connecting joint and the inner assembly connecting joint comprises a heim joint.

3. The adjustable vehicle suspension link system of claim 1 further comprising at least one retaining mechanism retaining the inner assembly at a selected length from the outer assembly.

4. The adjustable vehicle suspension link system of claim 1 further comprising a plurality of outer assembly adjusting threads in the outer assembly and a plurality of inner assembly adjusting threads on the inner assembly, the plurality of inner assembly adjusting threads engaging the plurality of outer assembly adjusting threads.

5. The adjustable vehicle suspension link system of claim 1 wherein the inner assembly comprises an inner assembly arm and a length adjusting member extending from the inner assembly arm, the length adjusting member adjustably and securably disposed in the outer assembly.

6. An adjustable vehicle suspension link system suitable for connecting a first component to a second component in a vehicle suspension, comprising:
   an outer assembly;
   an outer assembly connecting joint carried by the outer assembly, the outer assembly connecting joint configured for coupling to the first component of the vehicle suspension;
   an inner assembly disposed at least partially inside and in length-adjustable and securable relationship to the outer assembly;
   an inner assembly connecting joint carried by the inner assembly, the inner assembly connecting joint configured for coupling to the second component of the vehicle suspension;
   at least one retaining mechanism retaining the inner assembly at a selected length from the outer assembly; and
   wherein the at least one retaining mechanism comprises at least one set screw opening in the outer assembly and at least one set screw extending through the at least one set screw opening and engaging the inner assembly.

7. An adjustable vehicle suspension link system suitable for connecting a first component to a second component in a vehicle suspension, comprising:
   an outer assembly;

an outer assembly connecting joint carried by the outer assembly, the outer assembly connecting joint configured for coupling to the first component of the vehicle suspension;

an inner assembly disposed at least partially inside and in length-adjustable and securable relationship to the outer assembly;

an inner assembly connecting joint carried by the inner assembly, the inner assembly connecting joint configured for coupling to the second component of the vehicle suspension; and wherein the outer assembly comprises an outer assembly sleeve and an outer assembly arm extending from the outer assembly sleeve, and the inner assembly is extendable from the outer assembly sleeve and the outer assembly connecting joint is carried by the outer assembly arm.

8. An adjustable vehicle suspension link system suitable for connecting a first component to a second component in a vehicle suspension, comprising:

an outer assembly including:
  an outer assembly sleeve having an elongated sleeve wall with an adjusting end, an arm connecting end opposite the adjusting end and a sleeve bore extending from the adjusting end to the arm connecting end;
  an outer assembly arm extending from the outer assembly sleeve, the outer assembly arm having an elongated outer assembly arm wall with a sleeve connecting end at the arm connecting end of the outer assembly sleeve, an outer assembly joint end opposite the sleeve connecting end and an outer assembly arm bore extending from the sleeve connecting end to the outer assembly joint end and communicating with the sleeve bore of the outer assembly sleeve; a plurality of interior outer assembly adjusting threads at least between the sleeve bore of the outer assembly sleeve and the outer assembly arm bore of the outer assembly arm; and
  an outer assembly connecting joint carried by outer assembly joint end of the outer assembly arm, the outer assembly connecting joint configured for coupling to the first component of the vehicle suspension; and an inner assembly disposed at least partially inside and in length-adjustable and securable relationship to the outer assembly, the inner assembly including:
  an inner assembly arm having an elongated inner assembly arm wall with an inner assembly joint end, a length adjusting member end opposite the inner assembly joint end and an inner assembly arm bore extending from the inner assembly joint end to the length adjusting member end;
  an elongated length adjusting member extending from the length adjusting member end of the inner assembly arm;
  a plurality of inner assembly adjusting threads on the length adjusting member, the plurality of inner assembly adjusting threads engaging the plurality of outer assembly adjusting threads in the outer adjusting assembly; and
  an inner assembly connecting joint carried by the inner assembly joint end of the inner assembly arm, the inner assembly connecting joint configured for coupling to the second component of the vehicle suspension.

9. The adjustable vehicle suspension link system of claim 8 wherein at least one of the outer assembly connecting joint and the inner assembly connecting joint comprises a heim joint.

10. The adjustable vehicle suspension link system of claim 8 further comprising at least one retaining mechanism retaining the inner assembly at a selected length from the outer assembly.

11. The adjustable vehicle suspension link system of claim 10 wherein the at least one retaining mechanism comprises at least one set screw opening in the sleeve wall of the outer assembly sleeve of the outer assembly and at least one set screw extending through the at least one set screw opening and engaging the inner assembly arm of the inner assembly.

12. The adjustable vehicle suspension link system of claim 8 further comprising an inner assembly joint neck extending from the inner assembly joint end of the inner assembly arm, and wherein the inner assembly connecting joint extends from the inner assembly joint neck.

13. The adjustable vehicle suspension link system of claim 8 further comprising an outer assembly joint neck extending from the outer assembly joint end of the outer assembly arm, and wherein the outer assembly connecting joint extends from the outer assembly joint neck.

14. The adjustable vehicle suspension link system of claim 8 further comprising a sleeve connecting neck extending from the sleeve connecting end of the outer assembly arm of the outer assembly, and wherein the sleeve connecting neck is inserted in the arm connecting end on the outer assembly sleeve of the outer assembly.

15. The adjustable vehicle suspension link system of claim 8 wherein the plurality of inner assembly adjusting threads on the length adjusting member traverses substantially an entire length of the length adjusting member.

16. A method of connecting a first component to a second component in a vehicle suspension, comprising:
  obtaining an outer assembly having an outer assembly arm, an outer assembly sleeve extending from the outer assembly arm, an outer assembly connecting joint on the outer assembly arm and a plurality of outer assembly adjusting threads in the outer assembly arm;
  obtaining an inner assembly having an inner assembly arm, a length adjusting member extending from the inner assembly arm, an inner assembly connecting joint on the inner assembly arm and a plurality of inner assembly adjusting threads on the length adjusting member;
  forming an adjustable vehicle suspension link system by inserting the length adjusting member of the inner assembly into the outer assembly sleeve of the outer assembly;
  attaining a selected length of the adjustable vehicle suspension link system by engaging the plurality of inner assembly adjusting threads on the length adjusting member of the inner assembly with the plurality of outer assembly adjusting threads in the outer assembly arm of the outer assembly;
  securing the selected length of the adjustable vehicle suspension link system; and
  installing the adjustable vehicle suspension link system between the first component and the second component of the vehicle suspension.

17. The method of claim 16 wherein securing the selected length of the adjustable vehicle suspension link system comprises threading at least one set screw carried by the outer assembly sleeve of the outer assembly against the inner assembly arm of the inner assembly.

18. The method of claim 16 wherein installing the adjustable vehicle suspension link system between the first component and the second component of the vehicle suspension comprises providing an inner assembly connecting joint on the inner assembly arm of the inner assembly, providing an outer assembly connecting joint on the outer assembly arm of the outer assembly, connecting the inner assembly connecting joint to the first component and connecting the outer assembly connecting joint to the second component.

19. The method of claim 18 wherein providing an inner assembly connecting joint on the inner assembly arm of the inner assembly comprises providing a first heim joint on the inner assembly arm and wherein providing an outer assembly connecting joint on the outer assembly arm of the outer assembly comprises providing a second heim joint on the outer assembly arm of the outer assembly.

\* \* \* \* \*